US008869584B2

(12) United States Patent
Sokol

(10) Patent No.: US 8,869,584 B2
(45) Date of Patent: Oct. 28, 2014

(54) PROGRESSIVE CRIMPING METHOD

(75) Inventor: Robert L. Sokol, Orland Park, IL (US)

(73) Assignee: Panduit Corp., Tinley Park, IL (US)

(*) Notice: Subject to any disclaimer, the term of this patent is extended or adjusted under 35 U.S.C. 154(b) by 1243 days.

(21) Appl. No.: 12/099,927

(22) Filed: Apr. 9, 2008

(65) Prior Publication Data

US 2009/0255319 A1 Oct. 15, 2009

(51) Int. Cl.

| | |
|---|---|
| ***B21D 37/10*** | (2006.01) |
| ***H01R 43/04*** | (2006.01) |
| ***B23P 19/00*** | (2006.01) |
| ***H01R 43/048*** | (2006.01) |
| *H01R 4/18* | (2006.01) |
| *H01R 9/03* | (2006.01) |

(52) U.S. Cl.

CPC .............. *H01R 43/048* (2013.01); *H01R 4/186* (2013.01); *H01R 9/03* (2013.01)

USPC .................................. 72/416; 29/861; 29/753

(58) Field of Classification Search

USPC ......................... 72/173, 20.1–21.4, 416, 470; 29/861–863, 515–517, 520, 747, 29/750–754

See application file for complete search history.

(56) References Cited

U.S. PATENT DOCUMENTS

| | | | | |
|---|---|---|---|---|
| 2,566,725 | A | 6/1951 | Hurlbut | |
| 2,758,491 | A * | 8/1956 | Buchanan | 29/753 |
| 2,953,185 | A | 9/1960 | Lazar | |
| 3,032,603 | A | 5/1962 | Whitley | |
| 3,085,313 | A | 4/1963 | Macy | |
| 3,101,766 | A * | 8/1963 | Floyd, Jr. | 72/472 |
| 3,146,519 | A * | 9/1964 | Redwine | 29/862 |
| 3,235,654 | A * | 2/1966 | Eldridge, Jr. | 174/94 R |
| 3,267,717 | A | 8/1966 | Reischer | |
| 3,275,738 | A * | 9/1966 | Flynn et al. | 174/94 R |
| 3,345,692 | A * | 10/1967 | Cobaugh et al. | 29/747 |
| 3,457,764 | A | 7/1969 | McKee | |
| 3,504,417 | A | 4/1970 | Filia | |
| 3,525,107 | A | 8/1970 | Hays | |
| 3,665,927 | A | 5/1972 | Kurtz | |
| 3,746,777 | A | 7/1973 | Peek | |
| 3,889,048 | A | 6/1975 | Groth | |
| 4,019,236 | A | 4/1977 | Osman | |
| 4,126,936 | A * | 11/1978 | Koller | 29/863 |
| 4,292,833 | A | 10/1981 | Lapp | |

(Continued)

FOREIGN PATENT DOCUMENTS

AU 430525 B2 11/1972

OTHER PUBLICATIONS

Panduit: "Electrical Solutions CD-2001 Crimping Dies Used to Install Panduit Tap Part Numbers", Sep. 1, 2001.

(Continued)

*Primary Examiner* — Shelley Self
*Assistant Examiner* — Mohammad I Yusuf
(74) *Attorney, Agent, or Firm* — Christopher S. Clancy; James H. Williams

(57) ABSTRACT

Certain embodiments of the present invention provide a progressive crimping method. The method includes assembling a compression connector for crimping, the compression connector including a first section and a second section; crimping the compression connector to a first crimp depth; crimping the first section of the compression connector to a second crimp depth; and crimping the second section of the compression connector to the second crimp depth.

12 Claims, 21 Drawing Sheets

(56) References Cited

U.S. PATENT DOCUMENTS

| | | | |
|---|---|---|---|
| 4,350,843 A | | 9/1982 | Campbell et al. |
| 4,385,515 A | * | 5/1983 | Link et al. ........................ 72/416 |
| 4,974,314 A | | 12/1990 | Nickerson et al. |
| 5,042,285 A | | 8/1991 | Levy |
| 5,162,615 A | | 11/1992 | Schrader et al. |
| 5,193,379 A | | 3/1993 | Ferraro |
| 5,291,772 A | | 3/1994 | Ferraro |
| 5,421,186 A | | 6/1995 | Lefavour |
| 5,428,983 A | | 7/1995 | Liu |
| 5,635,676 A | | 6/1997 | Piriz |
| 5,657,417 A | | 8/1997 | DiTroia |
| 5,924,322 A | | 7/1999 | Caveney |
| 6,101,862 A | | 8/2000 | Rzasa et al. |
| 6,227,030 B1 | | 5/2001 | Lefavour et al. |
| 6,446,482 B1 | | 9/2002 | Heskey et al. |
| 6,452,103 B1 | | 9/2002 | Piriz et al. |
| 6,538,204 B2 | | 3/2003 | Connor |
| 6,552,271 B2 | | 4/2003 | Connor et al. |
| 6,626,711 B2 | | 9/2003 | Kitagawa et al. |
| 6,769,173 B2 | | 8/2004 | Chadbourne |
| 6,818,830 B2 | | 11/2004 | O'Grady |
| 7,165,436 B2 | | 1/2007 | Bitz |
| 7,493,791 B2 | | 2/2009 | Chadbourne |
| 8,148,639 B2 | | 4/2012 | Auphand et al. |
| 8,177,590 B2 | | 5/2012 | Tanaka et al. |
| 2004/0093999 A1 | | 5/2004 | Schmode |
| 2007/0134980 A1 | | 6/2007 | Poll et al. |
| 2009/0313820 A1 | | 12/2009 | Roman, Jr. et al. |

OTHER PUBLICATIONS

Tyco Electronics: "Instruction Sheet Hand Crimping Tool Tyco", Oct. 23, 2007.

* cited by examiner

PROGRESSIVE CRIMPING METHOD

BACKGROUND OF THE INVENTION

The present invention relates to compression connectors. More particularly, the present invention relates to systems and methods for progressively crimping compression connectors.

FIG. 1 is a flow chart of a method 100 for crimping a compression connector 10 according to the prior art. The method 100 includes the following steps, which are described in more detail below. At step 110, a compression connector 10 is assembled. At step 120, a first section 12 of the compression connector 10 is crimped to a crimp depth CD. At step 130, a second section 14 of the compression connector 10 is crimped to the crimp depth CD. At step 140, the third section 16 of the compression connector 10 is crimped to the crimp depth CD. The prior art crimping method 100 is described with reference to: the prior art crimping system 1000 of FIGS. 3-9.

At step 110 the compression connector 10 such as a Burndy® TYPE YGHP Compression Connector or a Burndy® YGRP Compression Connector, is prepared or assembled for crimping. For example, as best seen in FIG. 3, the compression connector 10 includes the first section 12, the second section 14, and the third section 16, corresponding to the center, the left side, and the right side, respectively, of the compression connector 10. The compression connector 10 includes a plurality of electrical conductor receiving channels 18 for receiving one or more electrical conductors 19, such as cables or wires. The wires 19 are inserted into the channels 18. However, assembling the compression connector 10 for crimping is difficult because prior to crimping, the wires 19 are not retained in the compression connector 10.

At step 120, the first section 12 of the compression connector 10 is crimped to the crimp depth CD using a crimping tool (not shown) and a pair of crimping dies 30. For example, as best seen in FIG. 3, the crimping dies 30 are positioned near the center 12 of the compression connector 10, although precise placement of the crimping dies 30 is difficult and depends on the skill level of the installer. Next, as best seen in FIG. 4, the center 12 of the compression connector 10 is crimped or compressed to the crimp depth CD using the crimping tool (see FIG. 4). The arrows in FIGS. 4-8 indicate movement (e.g., opening and closing) of the crimping tool and the crimping dies 40. Typically, a crimping tool has a specified tonnage rating (e.g., crimping force applied to contact area between compression connector 10 and crimping dies 30). The resultant crimp depth CD depends on the specified tonnage rating of the crimping tool. Additionally, the resultant crimp depth CD also depends on other factors, such as the type of compression connector (e.g., C-Tap, E-Tap, H-Tap) and the type of material (e.g., aluminum, copper, tin plating).

At step 130, the second section 14 of the compression connector 10 is crimped to the crimp depth CD. For example, as best seen in FIG. 5, the crimping dies 30 are positioned near the left side 14 of the compression connector 10, although precise placement of the crimping dies 30 is difficult and depends on the skill level: of the installer. Next, as best seen in FIG. 6, the left side 14 of the compression connector 1.0 is crimped or compressed to the crimp depth CD using the compression tool (see FIG. 4).

At step 140, the third section 16 of the compression connector 10 is crimped to the crimp depth CD. For example, as best seen in FIG. 7, the crimping die 30 is positioned near the right side 16 of the compression connector 20, although precise; placement of the crimping dies 30 is difficult and depends on the skill level of the installer. Next, as best seen in FIG. 8, the right side 16 of the compression connector 10 is crimped or compressed to the crimp depth CD using the compression tool (see FIG. 4).

As best seen in FIG. 9, the progressive crimping method 100 produces a non-uniform crimp. Moreover, the overall quality of the crimp is highly dependent upon the skill level of the installer.

U.S. Pat. Nos. 6,227,030 and 6,769,173 disclose prior art crimping methods having shortcomings similar to the prior art crimping method 100.

Therefore, there is a need for a method for progressively crimping a compression connector. More particularly, there is a need for a progressive crimping method that is simple, repeatable, and verifiable. Additionally, there is a need for a progressive crimping method that produces a uniform crimp along the entire length of the crimping surface. Furthermore, there is a need for a progressive crimping method that produces a crimp having high mechanical strength, low electrical resistance, and is sealed to prevent the ingress of moisture and other corrosive elements.

SUMMARY OF THE INVENTION

Certain embodiments of the present invention provide a progressive crimping method. The method includes assembling a compression connector for crimping, the compression connector including a first section and a second section; crimping the compression connector to a first crimp depth; crimping the first section of the compression connector to a second crimp depth; and crimping the second section of the compression connector to the second crimp depth.

Figure 1:
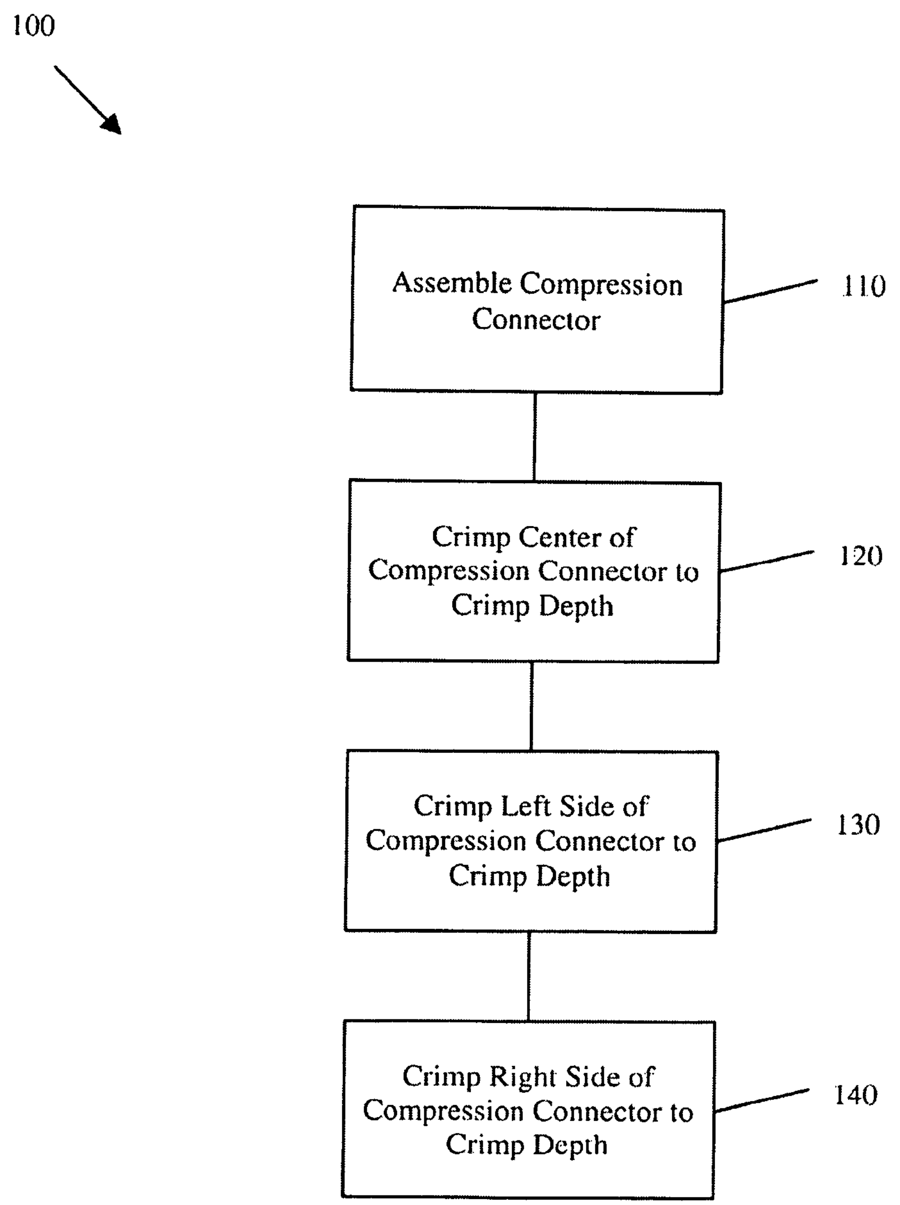
FIG. 1 is a flow chart of the method 100 for crimping the compression connector 10 according to the prior art.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

Figure 2:
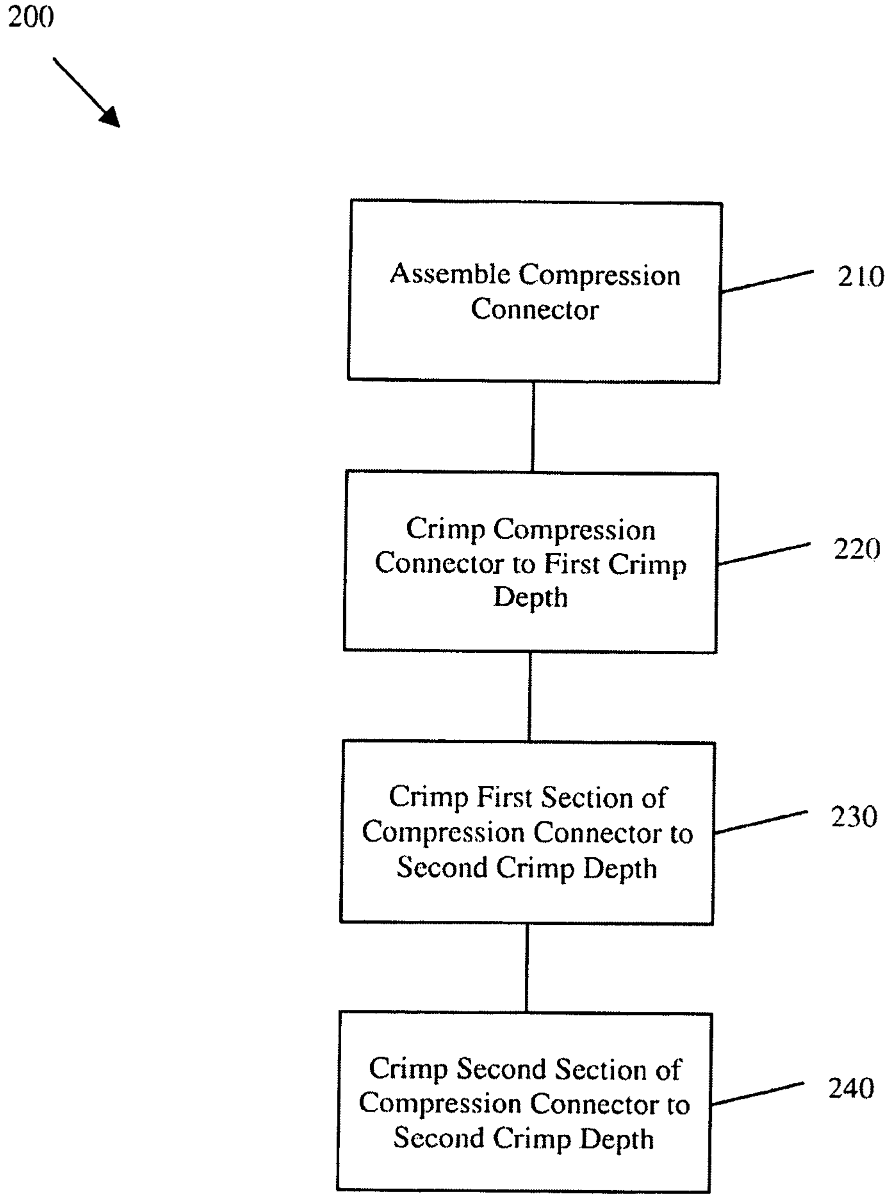
FIG. 2 is a flow chart of the method 200 for progressively crimping the compression connector 20 according to an embodiment of the present invention.
Figure 3:
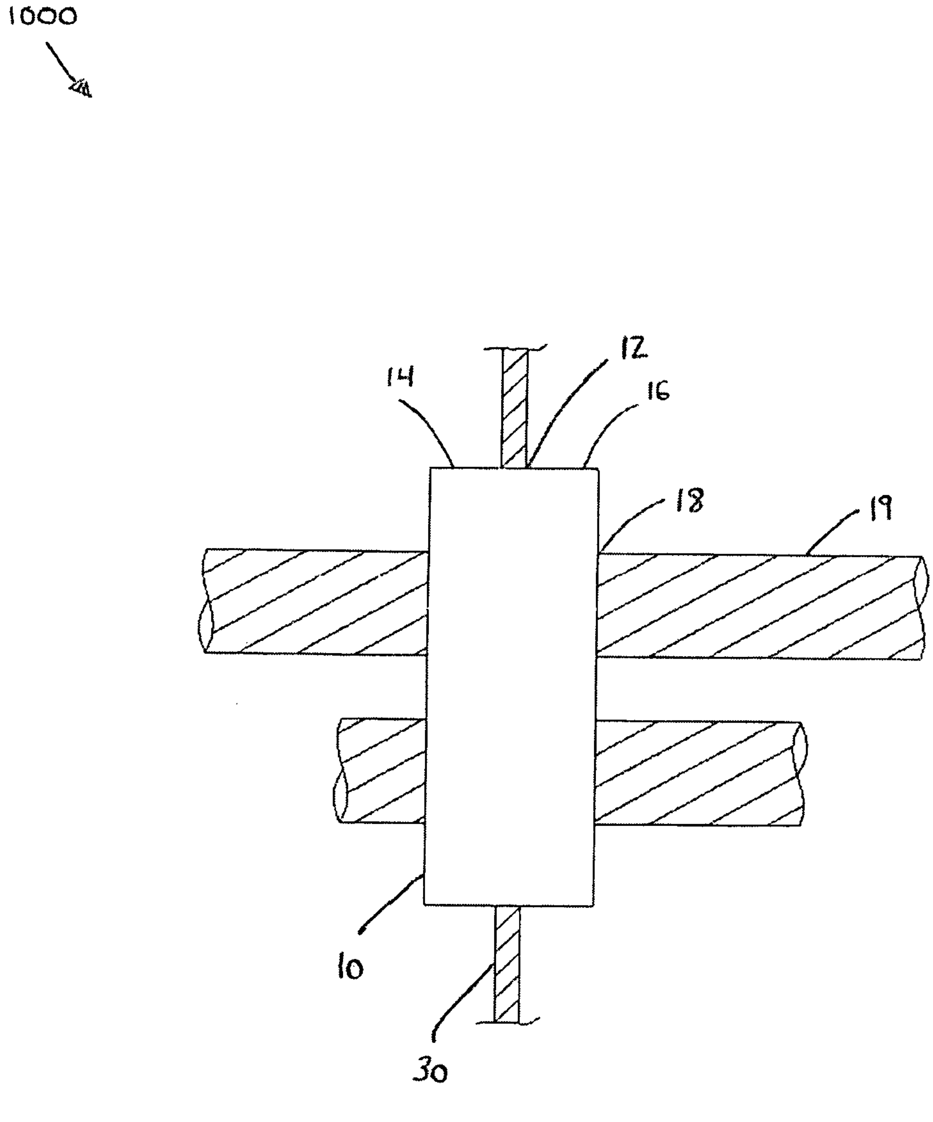
FIG. 3 illustrates the center 12 of the compression connector 10 positioned in the narrow crimp dies 30 prior to being crimped to the crimp depth CD according to step 120 of the crimping method 100 of FIG. 1.
Figure 4:
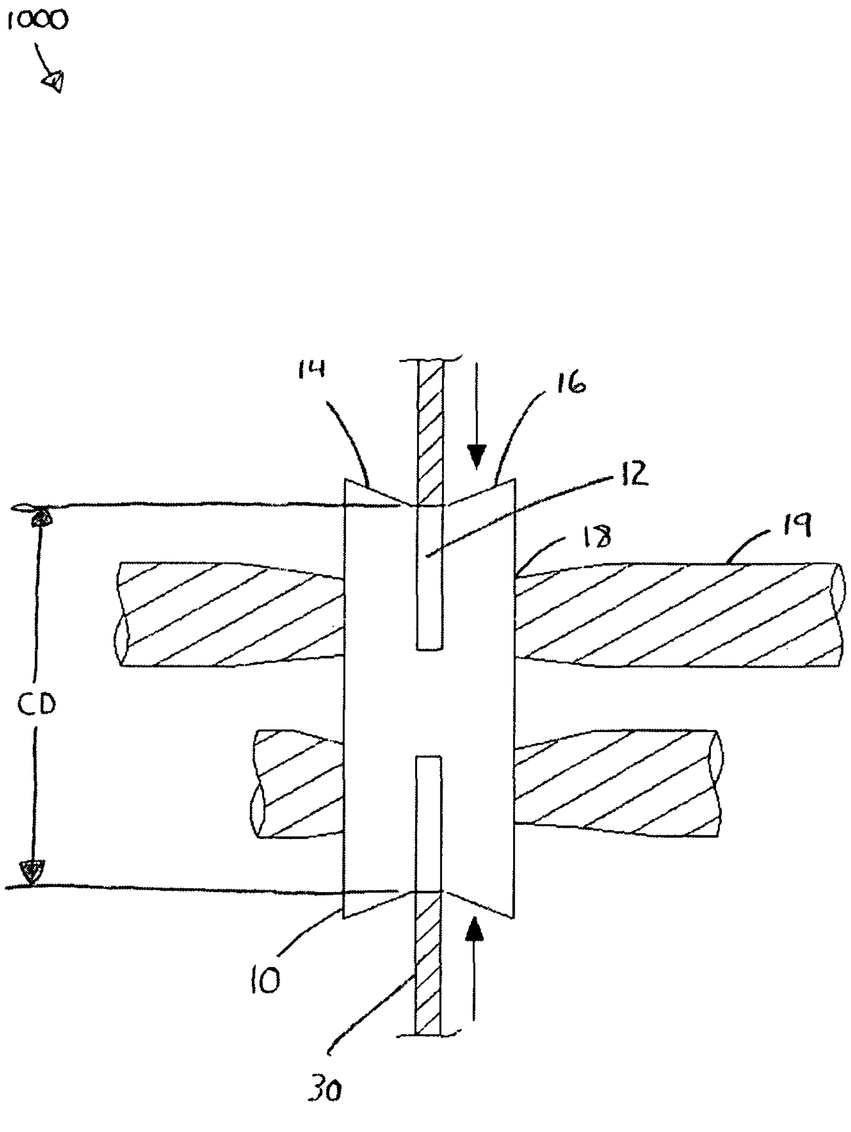
FIG. 4 illustrates the center 12 of the compression connector 10 being crimped to the crimp depth CD using the narrow crimp dies 30 according to step 120 of the crimping method 100 of FIG. 1.
Figure 5:
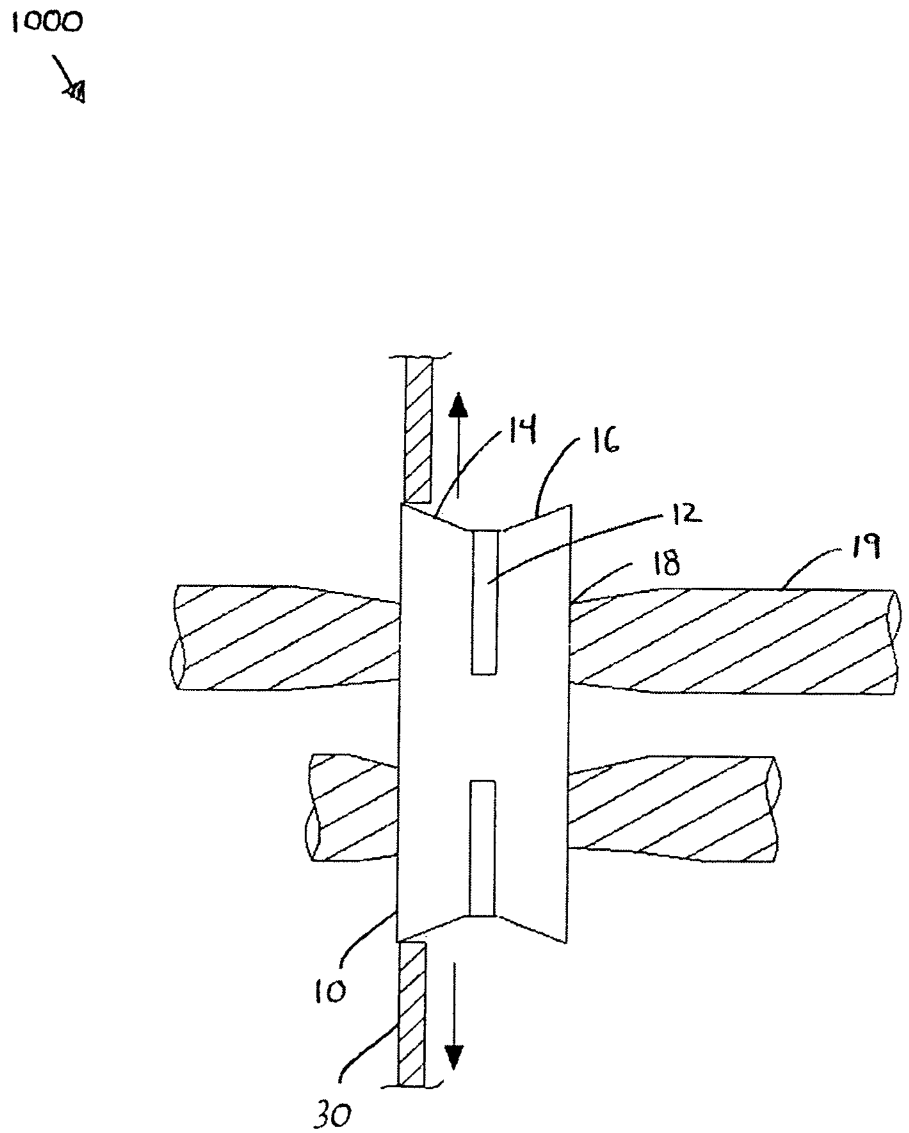
FIG. 5 illustrates the left side 14 of the compression connector 10 positioned in the narrow crimp dies 30 prior to being crimped to the crimp depth CD according to step 130 of the crimping method 100 of FIG. 1.
Figure 6:
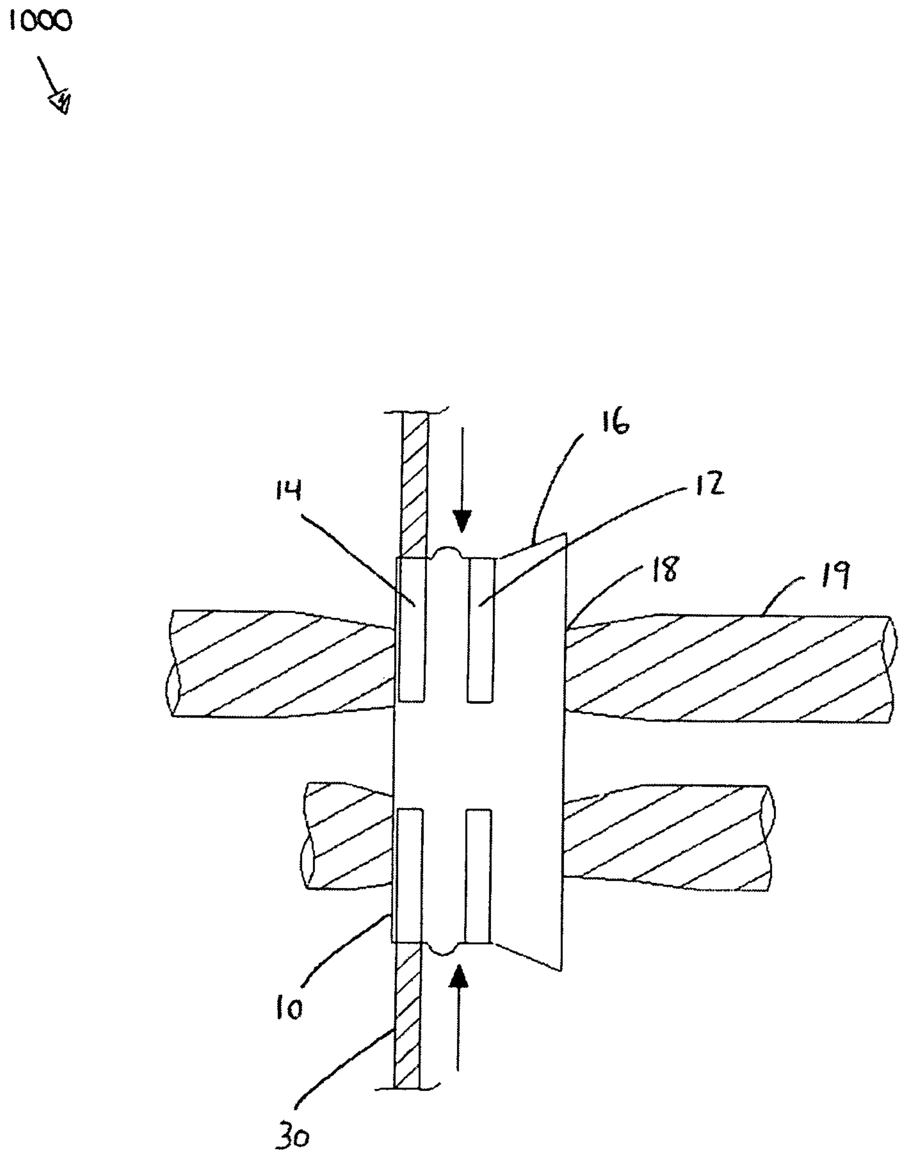
FIG. 6 illustrates the left side 14 of the compression connector 10 being crimped to the crimp depth CD using the narrow crimp dies 30 according to step 130 of the crimping method 100 of FIG. 1.
Figure 7:
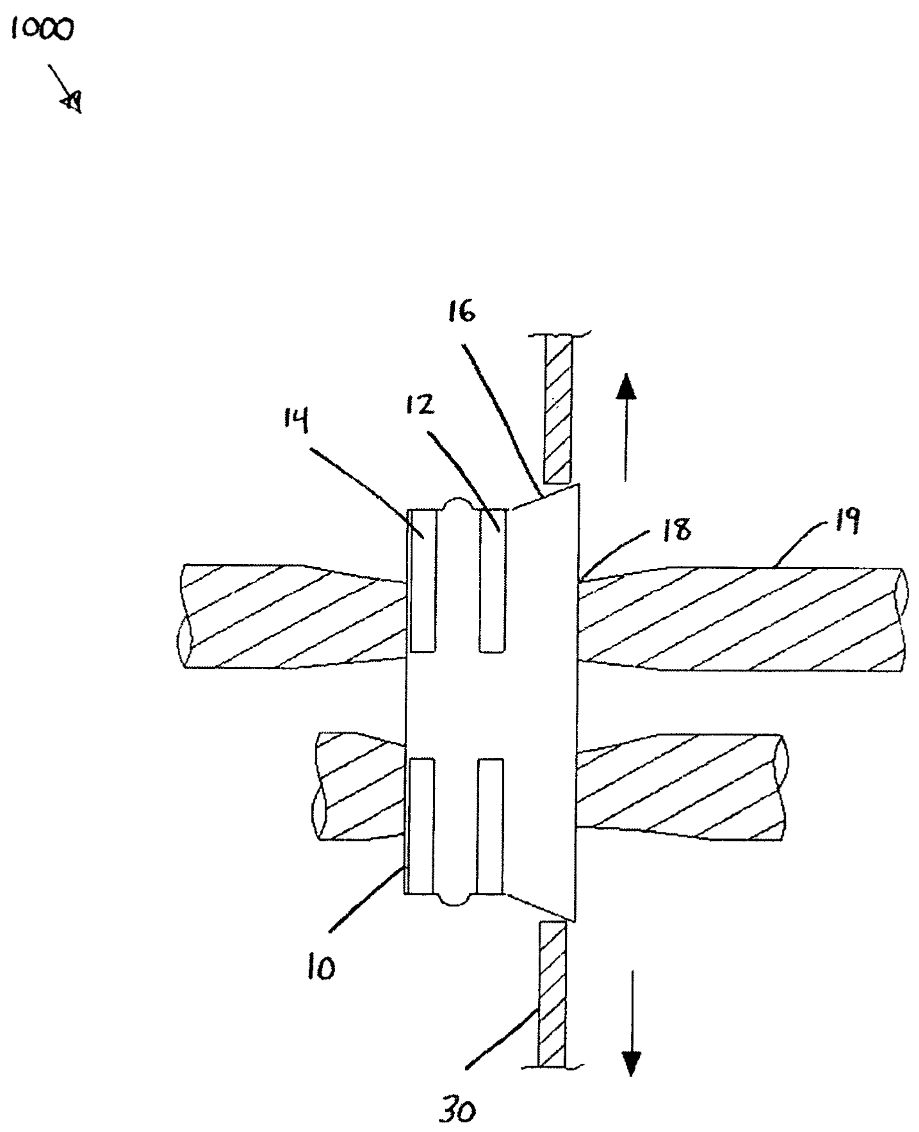
FIG. 7 illustrates the right side 16 of the compression connector 10 positioned in the narrow crimp dies 30 prior to being crimped to the crimp depth CD according to step 140 of the crimping method 100 of FIG. 1.
Figure 8:
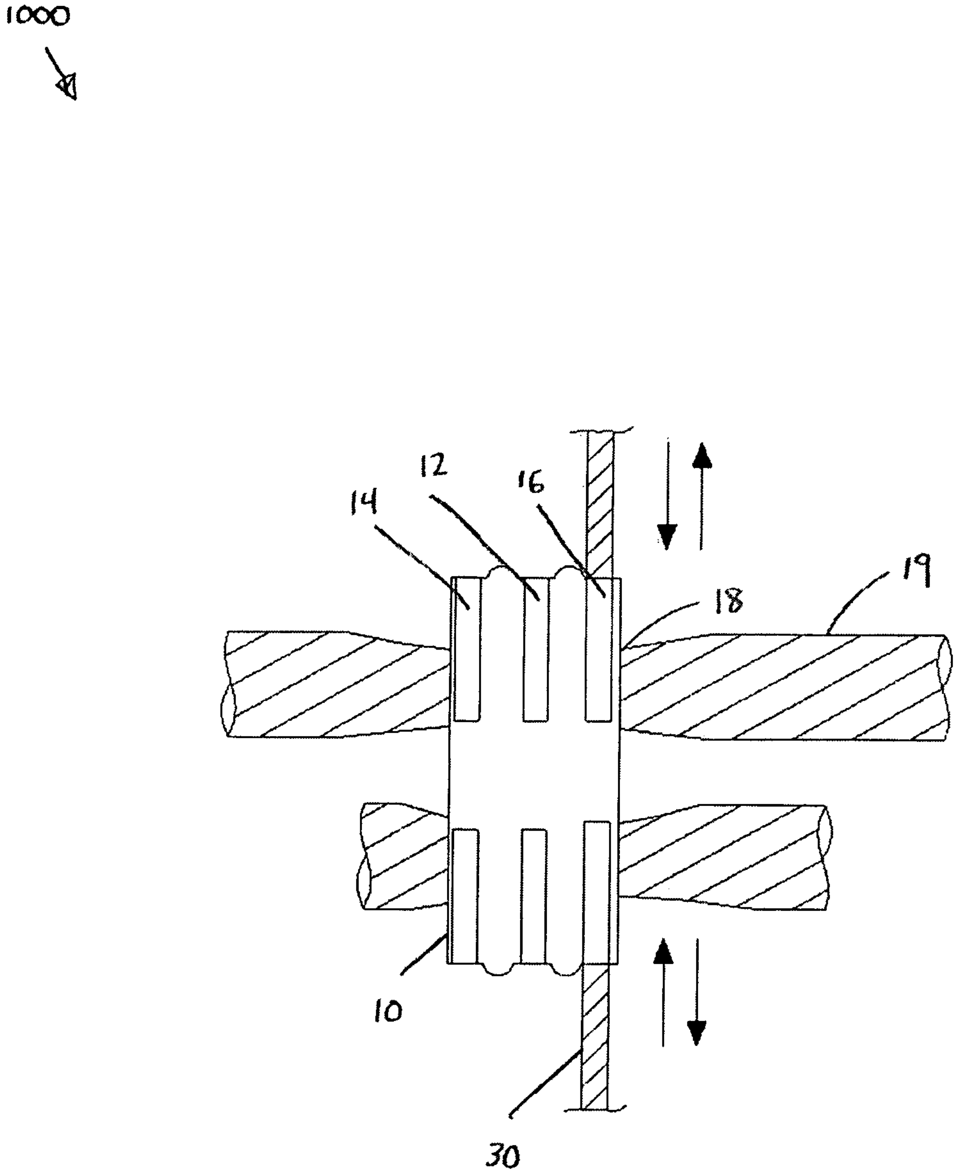
FIG. 8 illustrates the right side 16 of the compression connector 10 being crimped to the crimp depth CD using the narrow crimp dies 30 according to step 140 of the crimping method 100 of FIG. 1.
Figure 9:
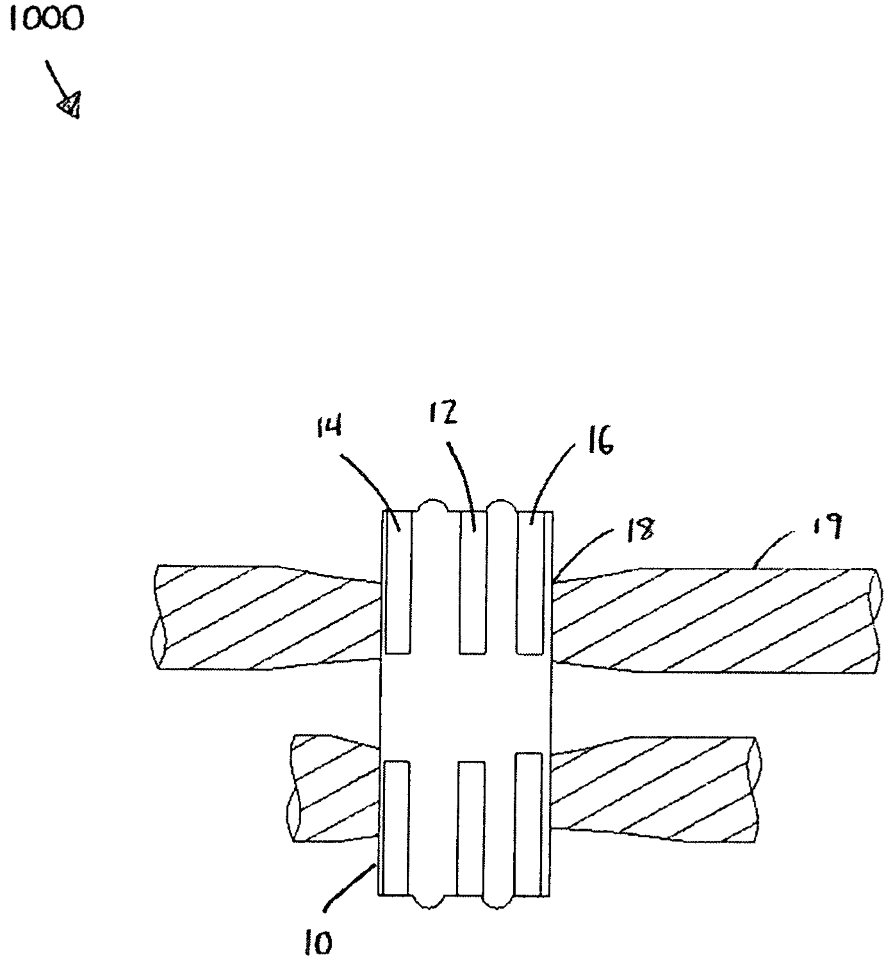
FIG. 9 illustrates the compression connector 10 after being crimped according to the method 100 of FIG. 1.

FIG. 2 is a flow chart of a method 200 for progressively crimping a compression connector 20 according to an embodiment of the present invention. The method 200 includes the following steps, which are described in more detail below. At step 210, a compression connector 20 is assembled. At step 220, the compression connector 20 is crimped to a first crimp depth CD1. At step 230, a first section 22 of the compression connector 20 is crimped to a second crimp depth CD2. At step 240, a, second section 24 of the compression connector 20 is crimped to the second crimp depth CD2. The method 200 is described with reference to the progressive crimping system 2000 of FIGS. 10-21, but it is understood that other implementations are possible.

Figure 10:
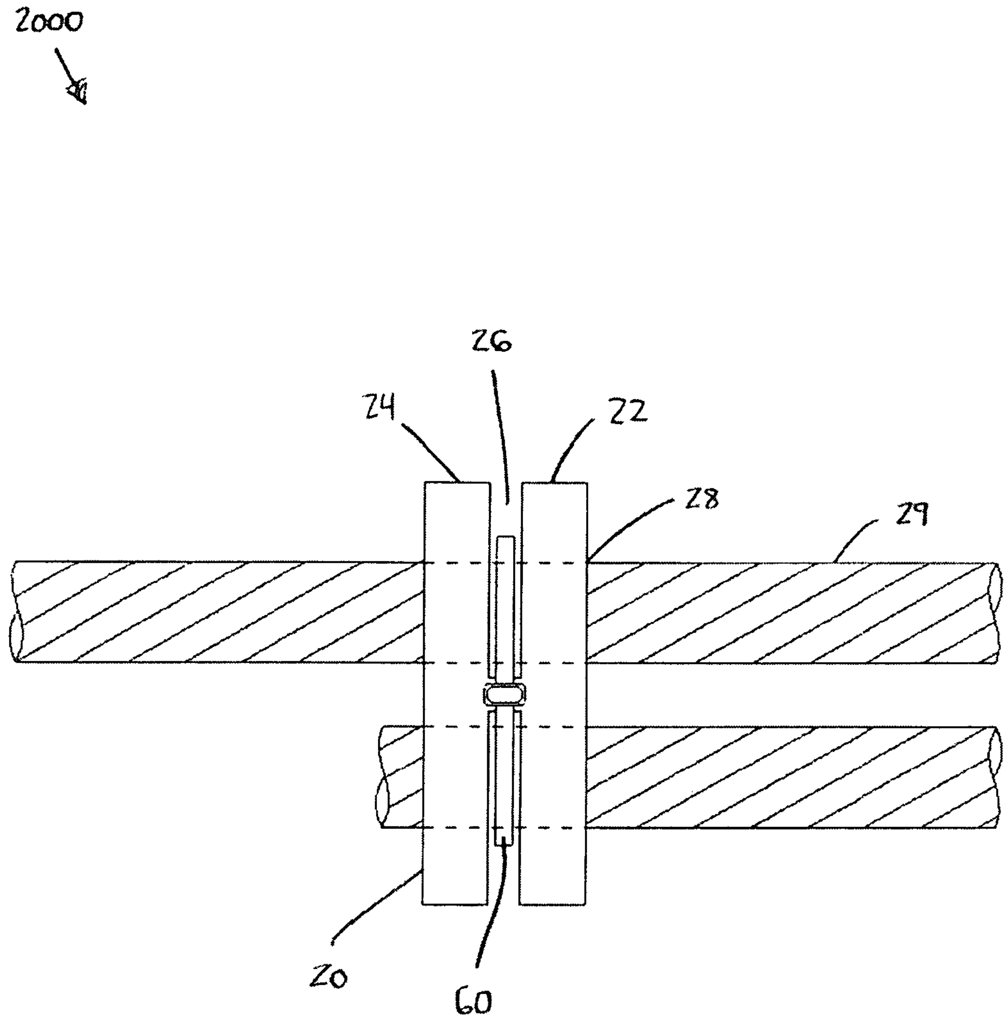
FIG. 10 illustrates the compression connector 20 assembled for crimping according to step 210 of the progressive crimping method 200 of FIG. 2.
Figure 18:
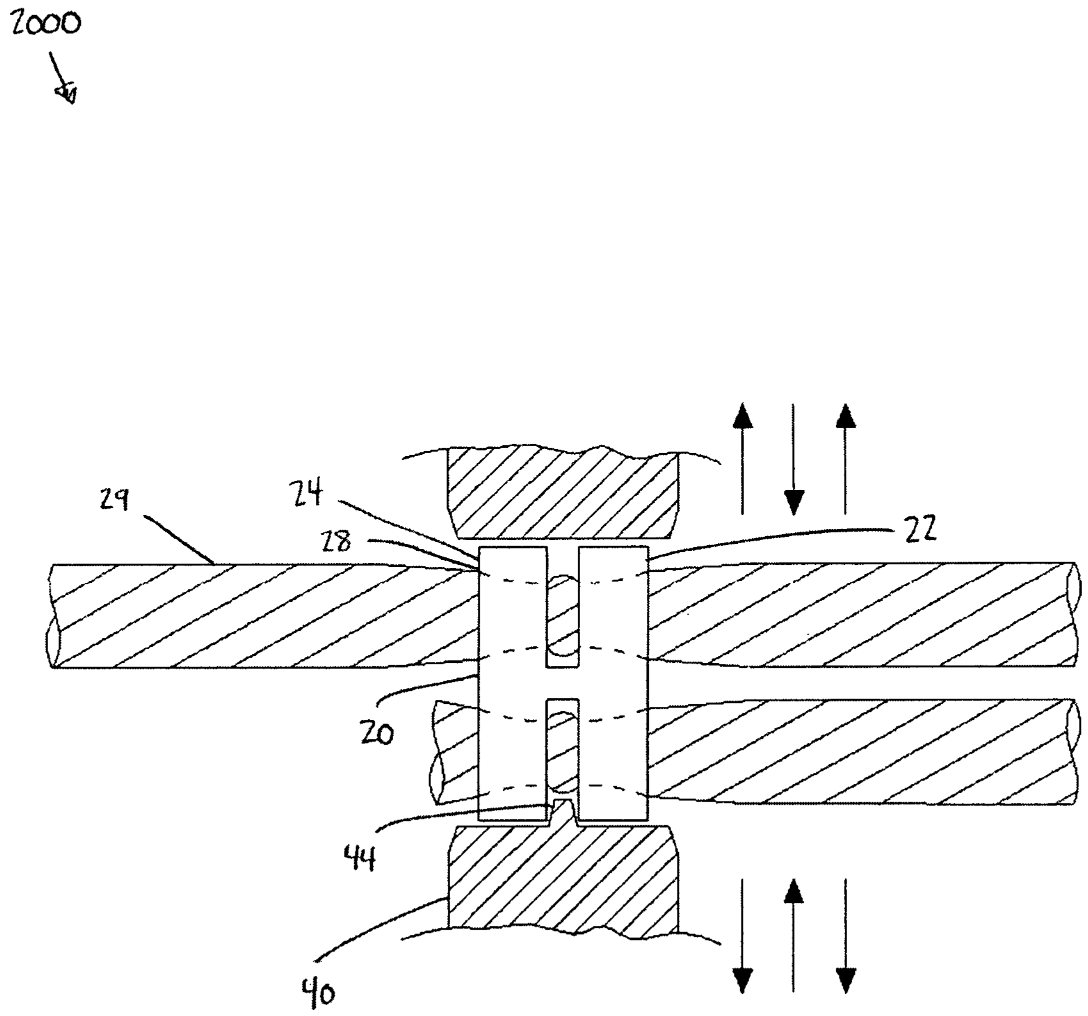
FIG. 18 illustrates the second section 24 of the compression connector 20 being crimped to the second crimp depth CD2 using the center locator crimp dies 40 according to step 240 of the progressive crimping method 200 of FIG. 2.
Figure 19:
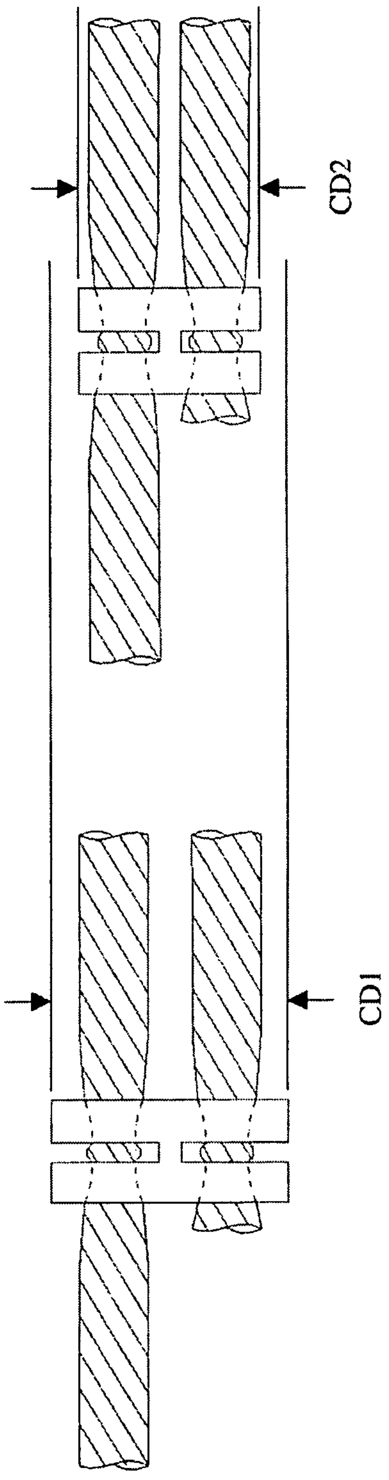
FIG. 19 illustrates a relative comparison of the first crimp depth CD1 and the second crimp depth CD2.
Figure 20:
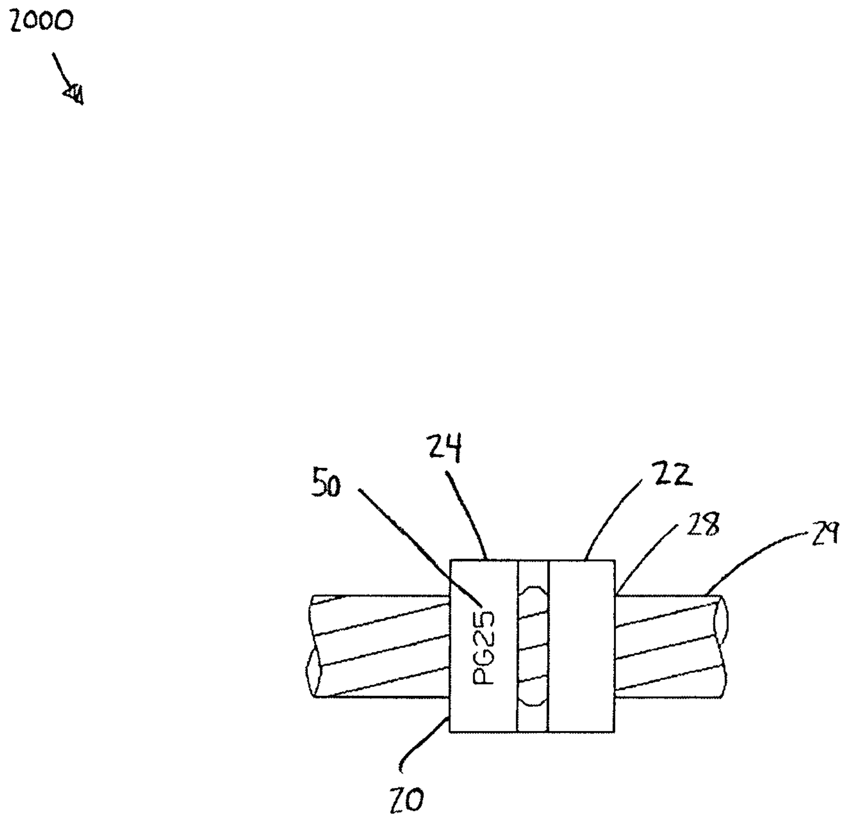
FIGS. 20-21 are examples of compression connectors 20 that include one or more identifiers 50 to indicate a type of crimp.
Figure 21:
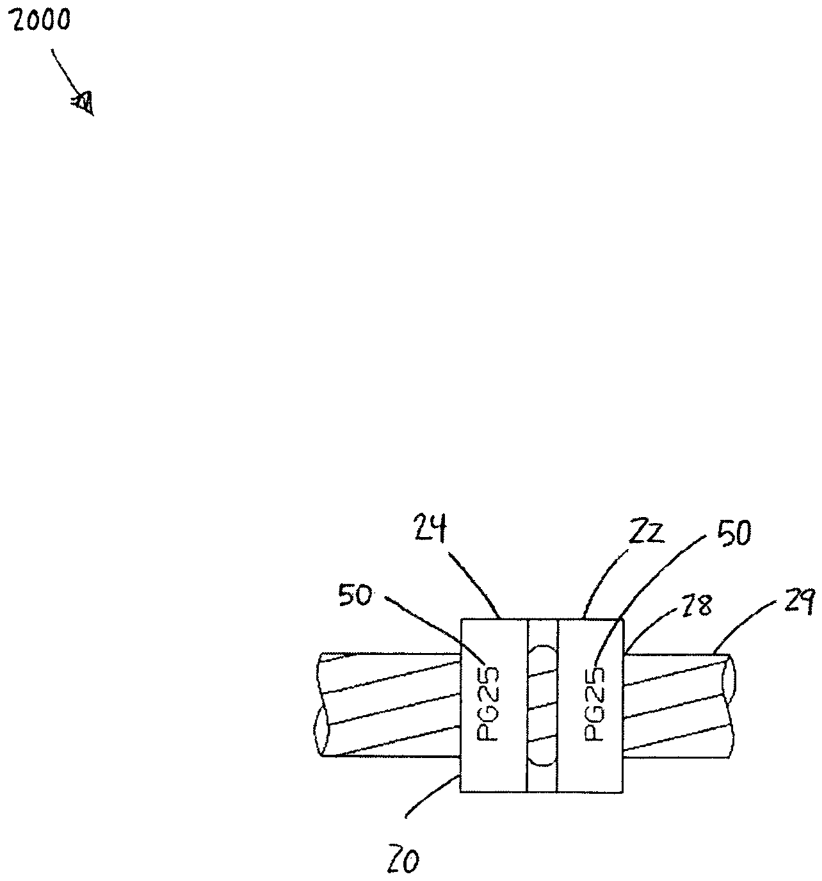

At step 210, the compression connector 20, such as a PANDUIT® HTCT H-Tap Compression Connector, is prepared or assembled for crimping, as described in U.S. Pat. Nos. 6,818,830 and 7,121,001, each of which is hereby incorporated by reference in its entirety. For example, as best seen in FIG. 10, the compression connector 20 includes the first section 22 and the second section 24. The first section 22 and the second section 24 of the compression connector 20 are separated by a plurality of slots 26, and include a plurality of electrical conductor receiving channels 28 (not shown) for receiving one or more electrical conductors 29, such as cables or wires. The wires 29 are inserted into the channels 28. Prior to crimping, the wires 29 are retained in the compression connector 10 using a cable tie 60. For clarity, the cable tie 60 has been omitted from FIGS. 11-18. The cable tie 60 may be removed from the compression connector 20 after crimping, as shown in FIGS. 19-21.

Figure 11:
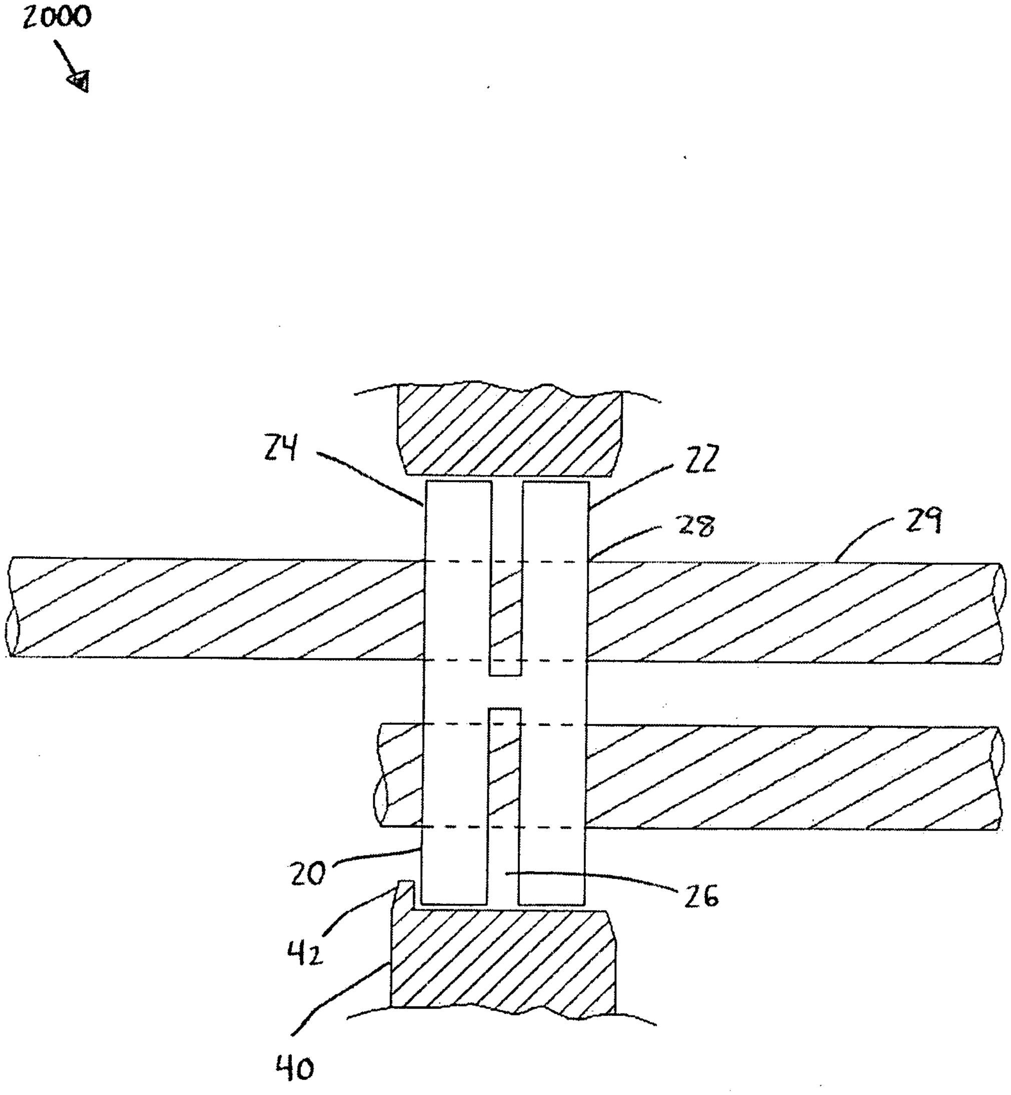
FIG. 11 illustrates the compression connector 20 positioned in the side locator crimp dies 40 prior to being crimped to the first crimp depth CD1 according, to step 220 of the progressive crimping method 200 of FIG. 2.
Figure 12:
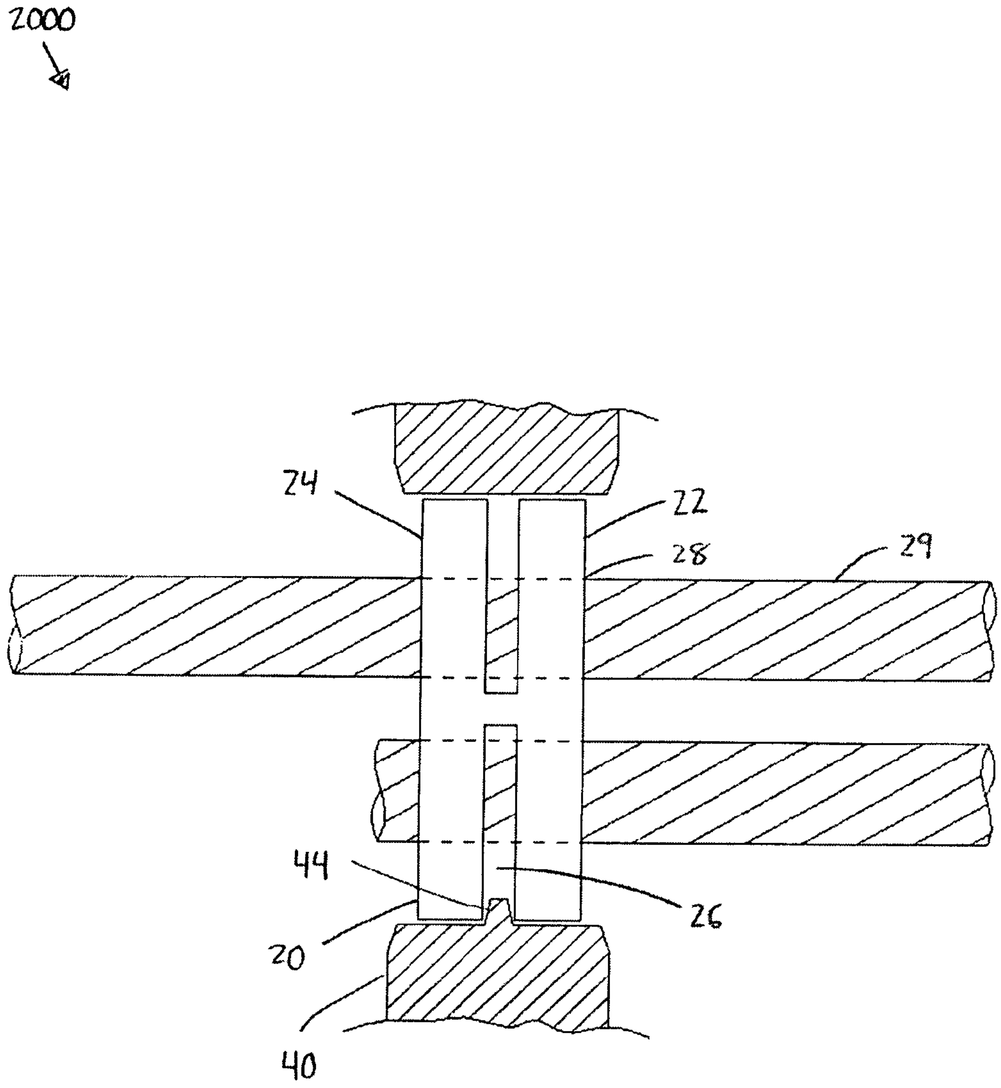
FIG. 12 illustrates the compression connector 20 positioned in the center locator crimp dies 40 prior to being crimped to the first crimp depth CD1 according to step 220 of the progressive crimping method 200 of FIG. 2.
Figure 13:
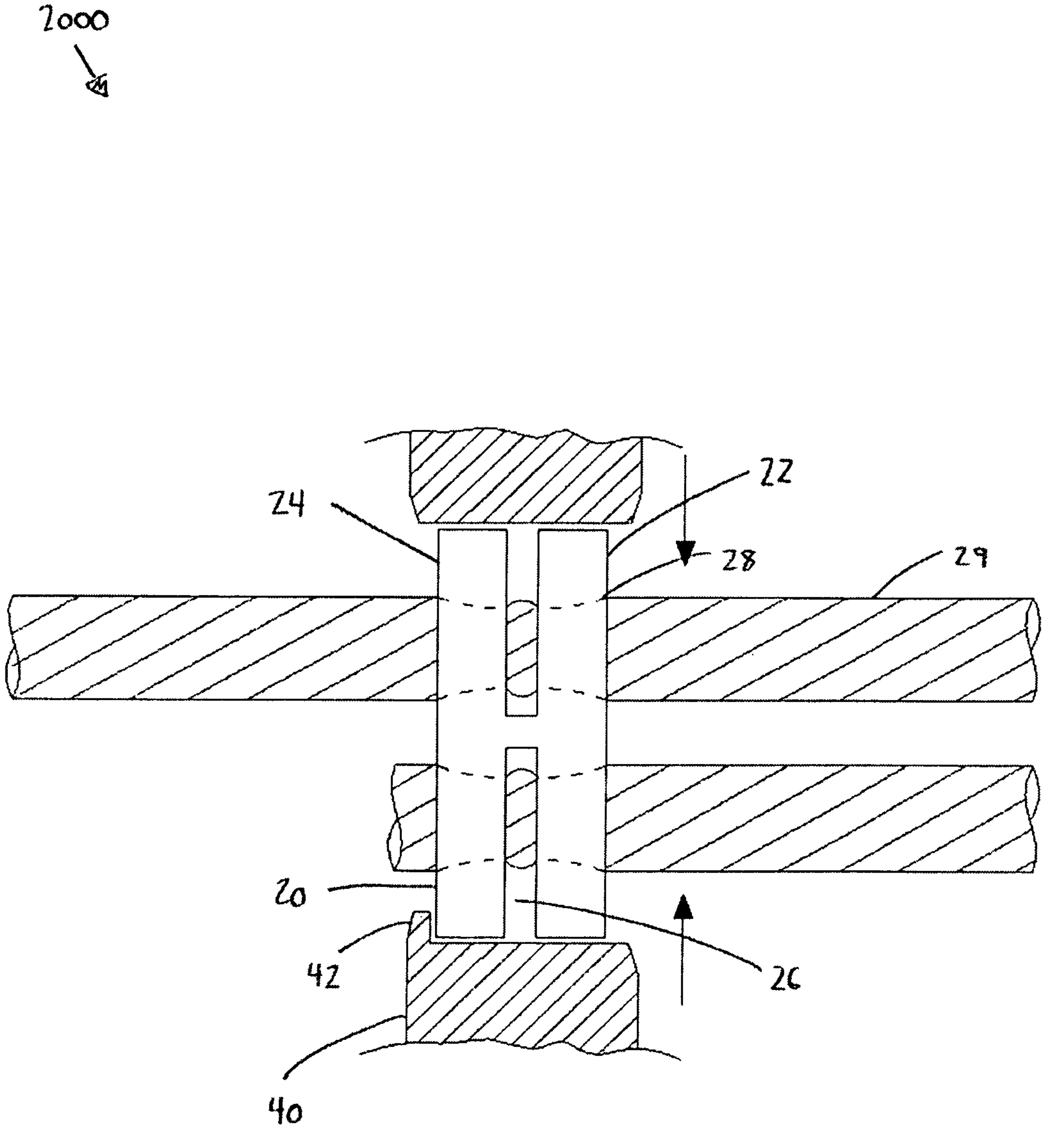
FIG. 13 illustrates the compression connector 20 being crimped, to the first crimp depth CD1 using the side locator crimp dies 40 according to step 220 of the progressive crimping method 200 of FIG. 2.
Figure 14:
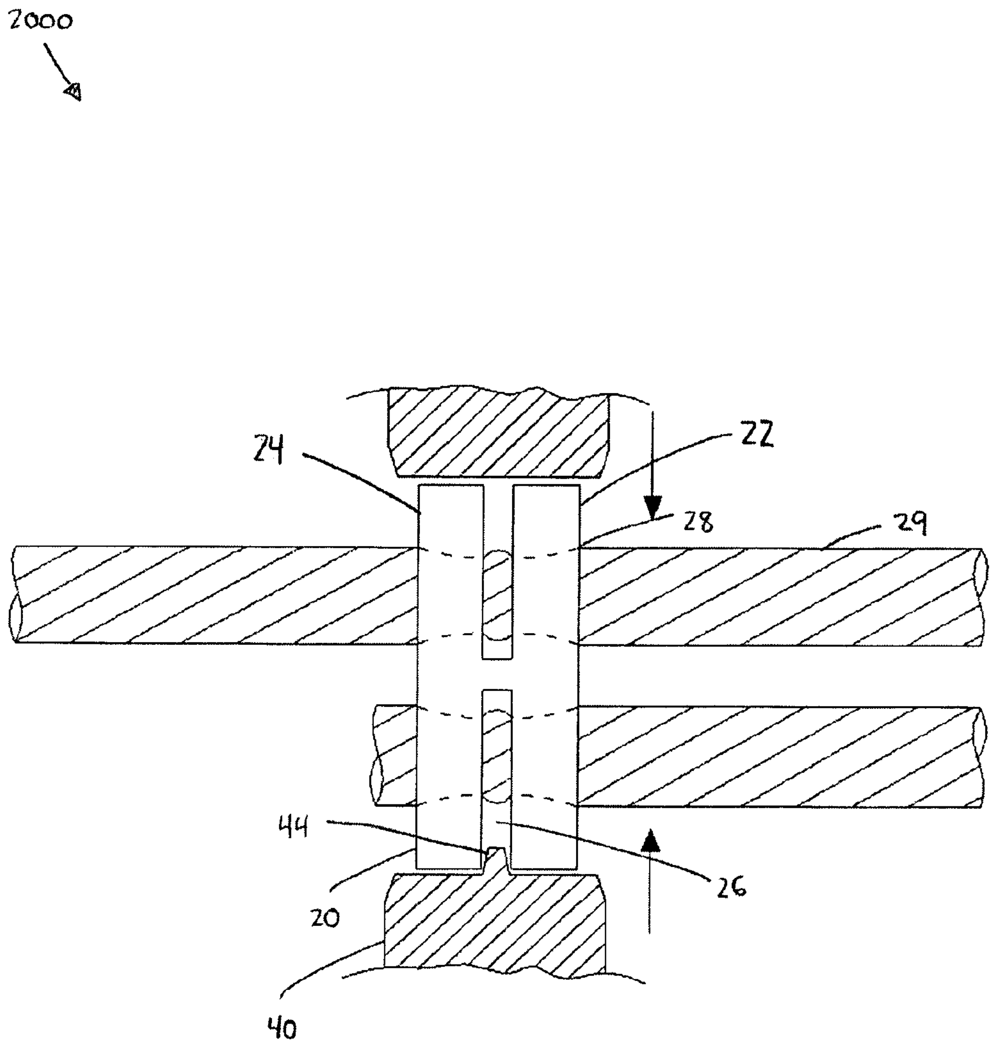
FIG. 14 illustrates the compression connector 20 being crimped to the first crimp depth CD1 using the center locator crimp dies 40 according to step 220 of the progressive crimping method 200 of FIG. 2.
Figure 15:
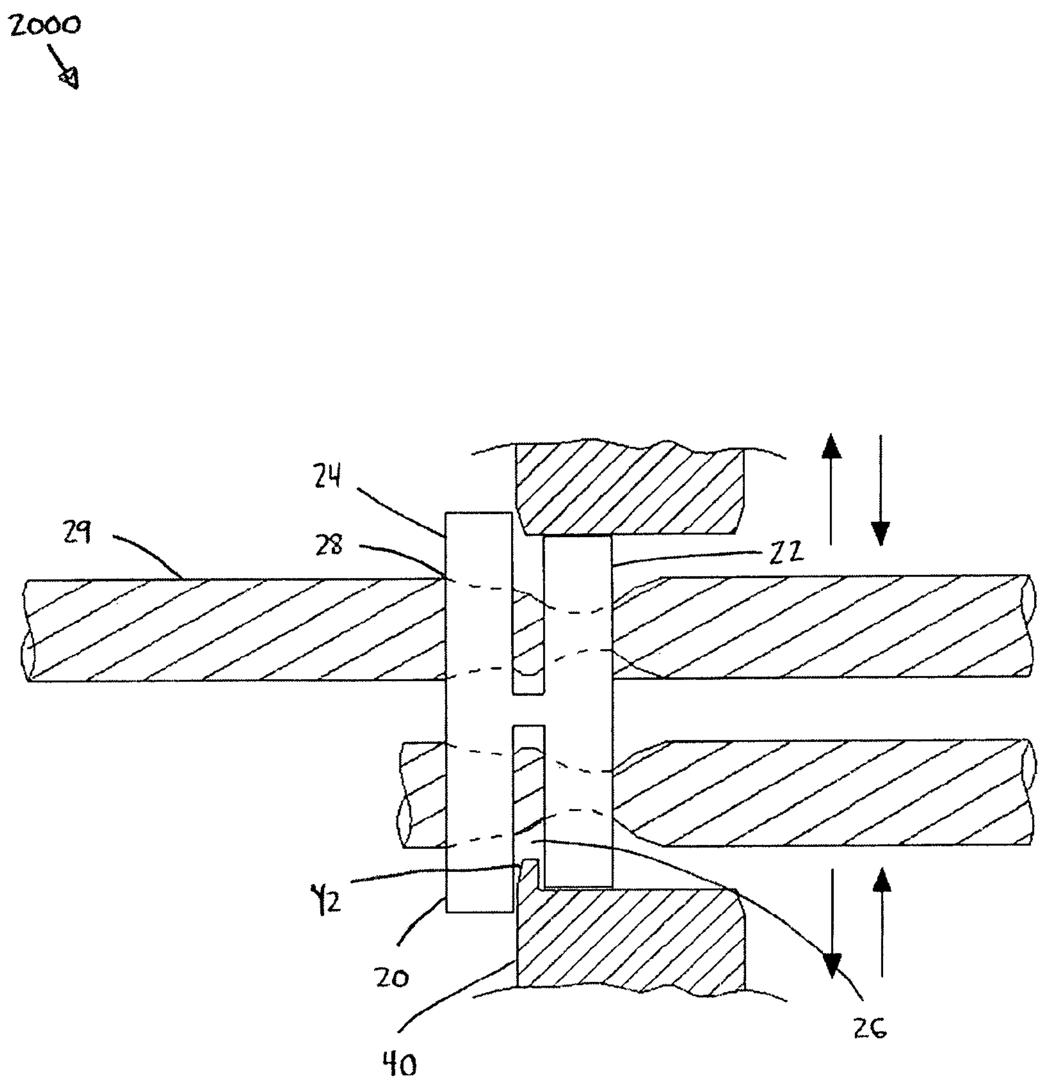
FIG. 15 illustrates the first section 22 of the compression connector 20 being crimped to a second crimp depth CD2 using the side locator crimp dies 40 according to step 230 of the progressive crimping method 200 of FIG. 2.

At step 220, the compression connector 20 is crimped to a first crimp depth CD1 using a crimping tool (not shown), such as a PANDUIT® CT-940CH Crimping Tool or a PANDUIT® CT-2940 Crimping Tool, and a pair of crimping dies 40, such as PANDUIT® CD920-H Crimping Dies or PANDUIT® CD-930H Crimping Dies. For example, as best seen in FIG. 11, the crimping dies 40 include a side locator 42, for example, as described in U.S. Pat. No. 7,165,436, which is hereby incorporated by reference in its entirety. As shown in FIG. 11, the side locator 42 of the crimping dies 40 is positioned adjacent to and to the left of the second section 24 of the compression connector 20. Alternatively, as best seen in FIG. 12, the crimping dies 40 include a center locator 44. As shown in FIG. 12, the center locator 44 of the crimp dies 40 is positioned in one or more of the slots 26 between the first section 22 and the second section 24 of the compression connector 20. Next, as best seen in FIG. 13 and FIG. 14, the first section 22 and the second section 24 of the compression connector 20 are crimped or compressed to the first crimp depth CD1 using the crimping tool (see FIG. 19). The arrows in FIGS. 13-18 indicate movement (e.g., opening and closing) of the crimping tool and the crimping dies 40. If, for example, the prior art method 100 and the progressive crimping method 200 are performed using similar compression connectors and similar crimping tools (e.g., crimping tools having similar tonnage ratings), then the crimp depth CD and the first crimp depth CD1, will be similar, but the second crimp depth CD2 will be less than the crimp depth CD and the first crimp depth CD1, resulting in a tighter overall crimp.

Figure 16:
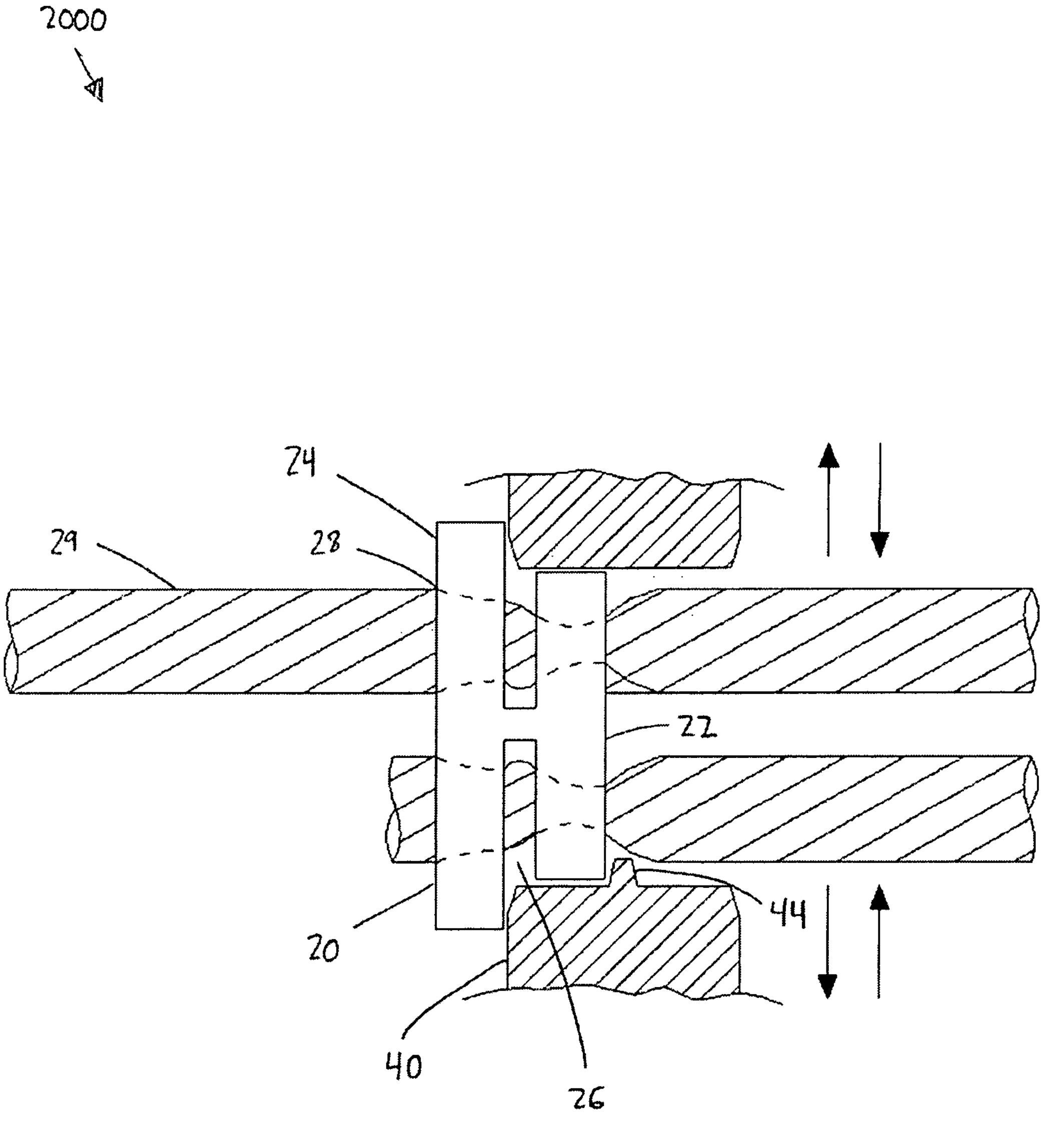
FIG. 16 illustrates the first section 22 of the compression connector 20 being crimped to a second crimp depth CD2 using the center locator crimp dies 40 according to step 230 of the progressive crimping method 200 of FIG. 2.

At step 230, the first section 22 of the compression connector 20 is crimped to a second crimp depth CD2. For example, as best seen in FIG. 115, the side locator 42 of the crimping dies 40 is positioned in one or more of the slots 26 between the first section 22 and the second section 24 of the compression connector 20. Alternatively, as best seen in FIG. 16, the center locator 44 of the crimping dies 40 is positioned adjacent to and to the right of the first section 22 of the compression connector 20. Next, the first section 22 of the compression connector 20 is crimped or compressed-to the second crimp depth CD2 using the crimping tool (see FIG. 19).

Figure 17:
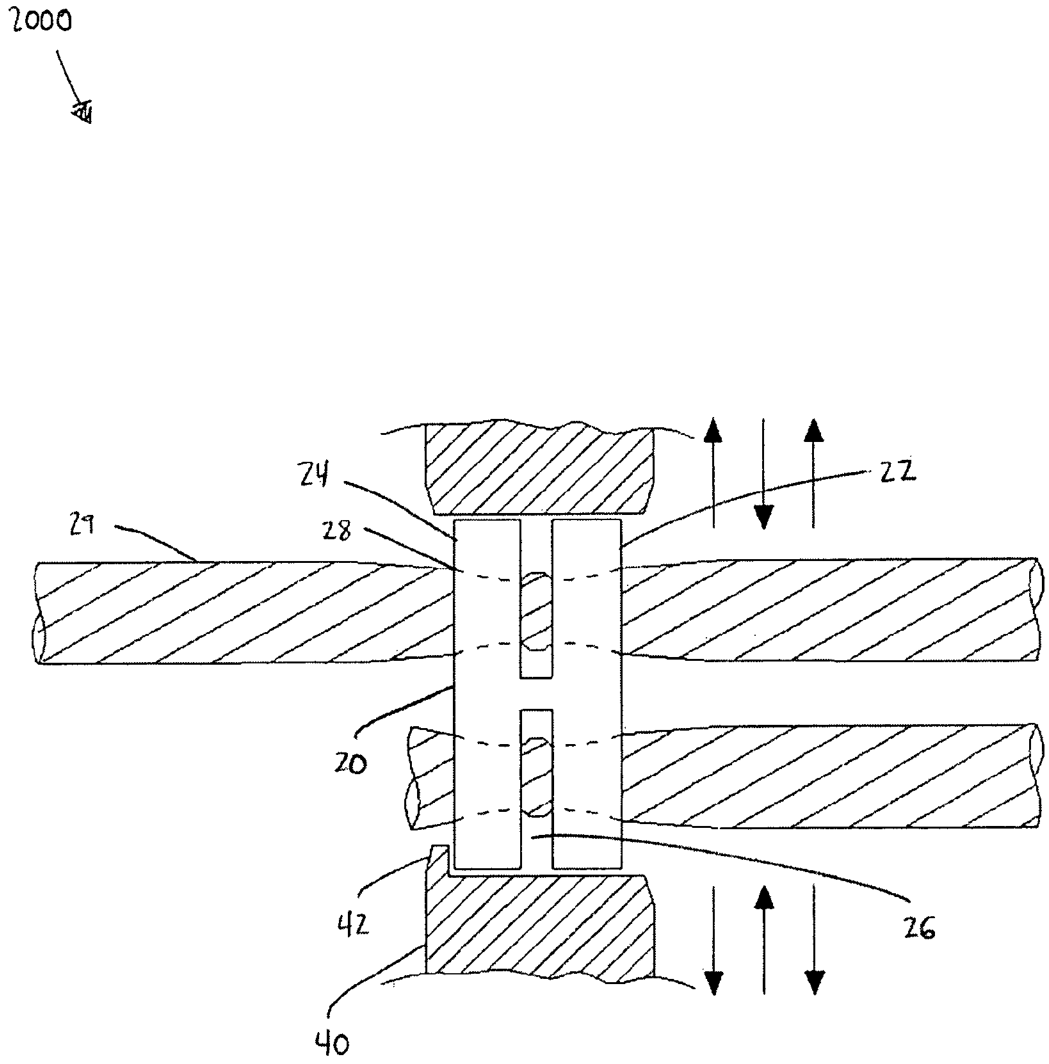
FIG. 17 illustrates tile second section 24 of the compression connector 20 being crimped to the second crimp depth CD2 using the side locator crimp dies 40 according to step 240 of the progressive crimping method 200 of FIG. 2.

At step 240, the second section 24 of the compression connector 20 is crimped to the second crimp depth CD2. For example, as best seen in FIG. 17, the side locator 42 of the crimping dies 40 is positioned adjacent to and to the left of the second section 22 of the compression connector 20. Alternatively, as best seen in FIG. 18, the center locator 44 of the crimping dies 40 is positioned in one or more of the slots 26 between the first section 22 and the second section 24 of the compression connector 20. Next, the second section 22 of the compression connector 20 is crimped or compressed to the second crimp depth CD2 using the crimping tool (see FIG. 19).

In certain embodiments of the present invention, the progressive crimping method 200 may be preformed using C-Tap, E-Tap, or H-Tap compression connectors.

Because the crimp dies 40 include the side locator 42 or the center locator 44, the overall quality of crimp is not as dependent on the skill level of the installer.

Because the first section 22 and the second section 24 of the compression connector 20 are crimped together, and then separately, the crimp is tighter than the crimp achieved using the prior art progressive crimping method 100.

A relative comparison of the first crimp depth CD1 and the second crimp depth CD2 is provided in FIG. 19.

In certain embodiments of the present invention, the compression connector 20 includes an identifier 50, such as "PG25", to indicate a type of crimp. For example, as best seen in FIG. 20, the second section 24 of the compression connector 20 includes the identifier 50, indicating that the compression connector 20 has been crimped to the first crimp depth CD1. Alternatively., as best seen in FIG. 21, the first section 22 and the second section 24 of the compression connector 20 include the identifier 50, indicating that the compression connector 20 has been crimped to the second crimp depth CD2. In the above examples, the identifier 50 is embossed on the compression connector 20 using the crimping tool and the crimping dies 40. Other forms of identification, such as labeling or color-coding, are likewise contemplated.

Certain embodiments of the present invention provide a progressive crimping method 200 that is simple, repeatable, and verifiable.

Certain embodiments of the present invention provide a progressive crimping method 200 that produces a uniform crimp along the entire length of the crimping surface.

Certain embodiments of the present invention provide a progressive crimping method 200 that produces a crimp having high mechanical strength, low electrical resistance, and is sealed to prevent the ingress of moisture and other corrosive elements. For example, a compression connector 20 crimped to the first crimp depth CD1 is capable of meeting the requirements of UL 467 for direct burial grounding connectors. As another example, a compression connector 20 crimped to the second crimp depth CD2 is also capable of meeting the more stringent requirements of IEEE Standard 837-2002, which were developed to qualify permanent connections used in electrical substation grounding.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features that come within the spirit and scope of the invention.

The invention claimed is:

1. A progressive crimping method comprising the steps of:

providing a compression connector, the compression connector including a first section and a second section;

positioning the first section and the second section in a pair of crimp dies;

simultaneously crimping the first section and the second section to a first crimp depth using the crimp dies;

repositioning the first section in the crimp dies;

separately crimping the first section from the first crimp depth to a second crimp depth using the crimp dies;

repositioning the second section in the crimp dies; and separately crimping the second section of the compression connector from the first crimp depth to the second crimp depth using the crimp dies.

2. The method of claim 1, wherein the compression connector includes a C-tap compression connector.

3. The method of claim 1, wherein the compression connector includes an E-tap compression connector.

4. The method of claim 1, wherein the compression connector includes an H-tap compression connector.

5. The method of claim 1, wherein the first and second sections of the compression connector are separated by one or more slots.

6. The method of claim 1, wherein the crimping dies include one or more locators.

7. The method of claim 6, wherein the one or more locators include one or more side locators.

8. The method of claim 6, wherein the one or more locators include one or more center locators.

9. The method of claim 1, wherein the compression connector includes at least one character applied to the compression connector using a crimping tool.

10. The method of claim 1, wherein the compression connector includes at least one character applied to the compression connector using a pair of crimping dies.

11. The method of claim 1, further including applying a first character to the compression connector when the first section of the compression connector and the second section of the compression connector are simultaneously crimped to the first crimp depth.

12. The method of claim 11, further including applying a second character to the compression connector when the first section of the compression connector and the second section of the compression connector are progressively crimped to the second crimp depth.

* * * * *